United States Patent [19]

Parker

[11] 4,022,576

[45] May 10, 1977

[54] METHOD AND APPARATUS FOR PREPARATION OF LIQUIDS CONTAINING SUSPENDED MATERIAL FOR EXAMINATION

[75] Inventor: James E. Parker, Long Beach, Calif.

[73] Assignee: I. C. L. Scientific, Fountain Valley, Calif.

[22] Filed: May 18, 1976

[21] Appl. No.: 684,951

Related U.S. Application Data

[63] Continuation-in-part of Ser. No. 585,191, June 9, 1975, abandoned.

[52] U.S. Cl. .......................... 23/230 R; 23/230 B; 23/259; 23/292; 73/425.4 R

[51] Int. Cl.² ...................... G01N 1/10; G01N 1/18

[58] Field of Search ........ 23/259, 292, 253, 230 R, 23/230 B; 73/425.4 R; 210/540

[56] References Cited

UNITED STATES PATENTS

| | | | |
|---|---|---|---|
| 3,481,477 | 12/1969 | Farr | 23/259 X |
| 3,540,852 | 11/1970 | Gorne et al. | 23/259 |
| 3,586,064 | 6/1971 | Brown et al. | 23/259 X |
| 3,590,889 | 7/1971 | Vannus | 23/259 X |
| 3,837,376 | 9/1974 | Brown et al. | 23/259 X |
| 3,870,639 | 3/1975 | Moore et al. | 23/259 X |
| 3,873,449 | 3/1975 | Connelly et al. | 23/259 X |

*Primary Examiner*—R.E. Serwin
*Attorney, Agent, or Firm*—Fulwider, Patton, Rieber, Lee & Utecht

[57] ABSTRACT

Method and apparatus for preparing a sample of liquid containing suspended material. The apparatus includes an elongated container with an open end, the internal cross section of the container being tapered to a smaller area near the closed end, and an elongated tube having, in one preferred embodiment, a hollow chamber of increased cross section near one end of the tube. The tube is insertable in the container so that the outer periphery of the chamber sealingly engages the inner wall of the container to seal a predetermined volume of liquid at the closed end of the container. The tube has an open lower end protruding into the predetermined volume of liquid, and has a sealed upper end fitted with a resilient bulb to facilitate withdrawal of the liquid into the hollow chamber. In an alternative embodiment, a sealing collar is employed instead of the hollow chamber, and the sample liquid is withdrawn into the tube itself.

The method of the invention includes introducing a known volume of liquid into the container and concentrating the material in the end portion thereof. The elongated tube is inserted into the container until the chamber or the sealing collar comes into sealing contact with the container wall, to seal the predetermined volume of liquid in the end portion of the container from the remaining liquid. With the seal in place, the remaining liquid is decanted off leaving the suspended material in the original sample concentrated in the predetermined volume of liquid in the lower end of the container. Liquid is then drawn into the tube from the sealed portion of the container by manipulating the bulb or the walls of the tube, and the tube is withdrawn from the container for transfer of the sample liquid to a microscope slide for examination.

21 Claims, 6 Drawing Figures

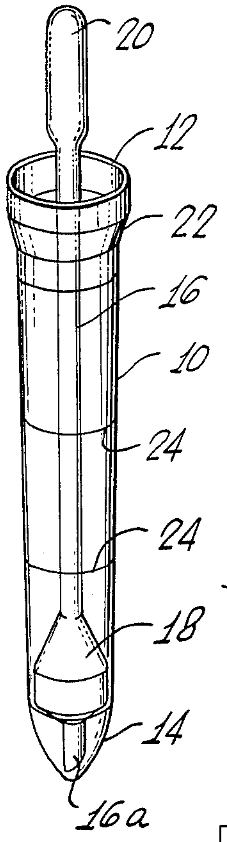
Fig.1
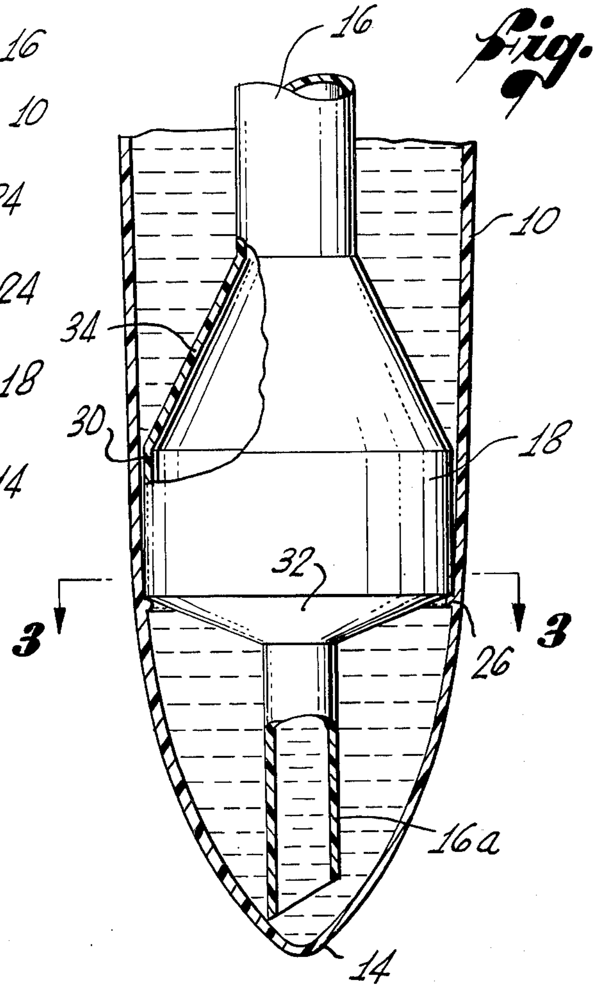
Fig.2
Fig.3
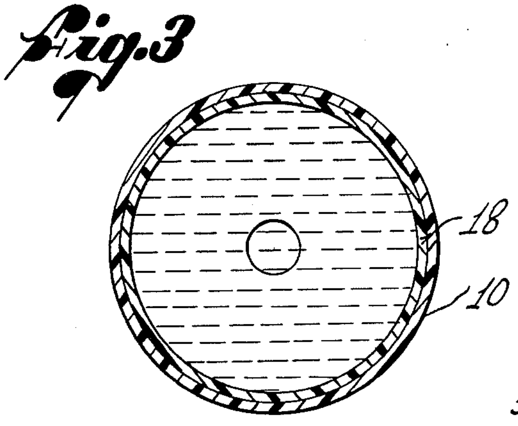
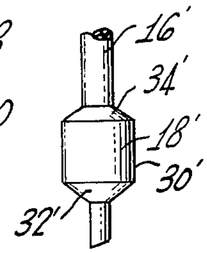
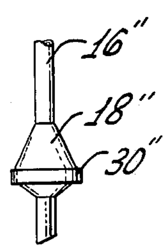
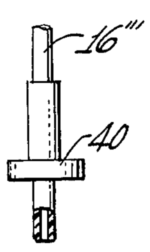
Fig.4 Fig.5 Fig.6

METHOD AND APPARATUS FOR PREPARATION OF LIQUIDS CONTAINING SUSPENDED MATERIAL FOR EXAMINATION

CROSS-REFERENCE TO RELATED APPLICATION

This is a continuation-in-part of United States application Ser. No. 585,191, filed June 9, 1975, and now abandoned, and having the same title as the present invention.

BACKGROUND OF THE INVENTION

This invention relates to laboratory testing procedures and, more particularly, to a method and apparatus for accurate, reproducible examination of urine specimens and the like.

In the field of clinical testing, the analysis of urine samples is carried out as a common routine to determine, for example, the amounts of sugar, albumin, and solids present in the specimen obtained from a patient. The results of such analysis provides a valuable tool for the diagnostician to aid in the determination of pathological conditions in the body, and in the detection of various diseases.

The procedures carried out in the performance of a urinalysis are well known and do not form a part of the present invention. However, it is important to note that microscopic examination of the urine sample forms an integral part of a urinalysis. Urine sediments are examined for cellular elements such as erythrocytes, leukocytes, epithelial cells, casts and crystals, the presence of which in more than normal amounts is an indication of a variety of system malfunctions.

Needless to say, the preparation of the urine specimen for microscopic examination is a critical element of the examination if the results are to be meaningful. In accordance with standard procedure, 12 ml of urine specimen are centrifuged for 5 minutes at 400g, i.e., at 400 times the gravitational acceleration force. The sediment is thereby suspended in about 1 ml of the urine, normally the lower 1 ml portion of the centrifuge tube. The upper 11 ml of sample is decanted off and usually only one drop of the remaining liquid containing suspended solids is taken for microscopic examination.

A highly important step in preparing the sample for microscopic examination is the decanting step to separate the major liquid portion of the sample from the 1 ml portion containing the suspended solids. Thus, for example, should more or less than 11 ml be decanted after centrifuging, the solids suspended in the remaining portion of the urine will be diluted or concentrated abnormally, and the resulting examination may be inaccurate and not reproducible. Likewise, lack of care in the decanting technique may result in the loss of suspended solids, and in correspondingly inaccurate and unreproducible results.

The present invention overcomes the aforementioned deficiencies in urinalysis technique and provides a method and apparatus for sample preparation to achieve accurate and reproducible microscopic examination.

SUMMARY OF THE INVENTION

The present invention resides in a method and apparatus for preparing liquid samples for examination of solids contained therein. In accordance with this invention, discrepancies in the estimation of suspended solids in a given volume of liquid due to indifferent or unskilled technique in sample preparation are substantially eliminated. Moreover, results are highly reproducible since the present invention insures that the sample will be prepared in the same way for each examination, even though different technicians may have prepared the samples.

More particularly, the apparatus of the present invention comprises an elongated container open at one end, closed at the opposite end, and provided with indicia for accurately introducing a given amount of sample. Preferably, the closed end is tapered or cone-shaped as an aid to collecting suspended solids during centrifuging or the like. The apparatus also includes an elongated tube having a portion of enlarged cross section adjacent one end. In one presently preferred embodiment of the invention, this portion of enlarged cross section defines a hollow chamber, while in an alternate embodiment the portion of enlarged cross section is an annular sealing collar. The chamber, or the collar, is so proportioned as to be freely received in the container, and to cooperate with the container walls to seal a predetermined volume at the closed end of the container. The end of the tube communicates with the sealed predetermined volume for purposes of withdrawing all or a portion of sample therefrom for examination.

In accordance with the method of the present invention, liquid to be examined is measured into the container utilizing the indicia on the container to obtain a known volume. Suspended solids are concentrated in the lower portions of the container by suitable means such as centrifuging. Following concentration of the suspended solids, the tube is inserted into the container until a seal is formed between the periphery of the chamber, or of the collar, and the interior container wall, thereby separating a known volume of liquid in the portion of the container from the liquid in the upper portions of the container. As a result of the seal thus formed, the liquid in the upper portion can be poured off without loss of the liquid remaining in the lower portion of the container. A sample of the remaining liquid is then drawn into the chamber, or just into the tube, for transport to a microscope slide or other instrument for examination of the solids contained therein.

Although the invention is described herein in connection with urinalysis, it will be appreciated that the invention is not so limited, and finds application in other procedures, for example, blood analysis and emulsion studies, where accurate and reproducible analysis of liquids containing suspended particles, droplets and the like is necessary.

Other aspects and advantages of the present invention will become apparent from the following more detailed description, taken in conjunction with the accompanying drawings.

BRIEF DESCRIPTION OF THE DRAWINGS

FIG. 1 is a perspective view of a container and elongated tube embodying the features of the present invention;

FIG. 2 is an enlarged fragmentary elevational view, partly in section, of the lower portion of the container and tube shown in FIG. 1;

FIG. 3 is a sectional view taken substantially along the line 3—3 in FIG. 2; and FIGS. 4–6 are fragmentary elevational views of alternate forms of the lower portion of the tube.

DETAILED DESCRIPTION

As shown in the drawings for purposes of illustration, the present invention is concerned with the handling of liguid samples, such as urine samples. In the preparation of such a sample for analysis, a measured volume of the sample is centrifuged in order to suspend the solids contained therein in a relatively small volume of liquid, typically 1 ml, the remaining liquid being decanted off after centrifuging. Unless special care is taken in the decanting step, inaccurate and unreproducible results can be obtained in subsequent analysis of the sample.

In accordance with the present invention, the liquid sample is prepared in an elongated tubular container 10 having an open upper end 12 and a closed lower end 14, and a predetermined volume of the sample is sealed in the closed end of the container by means of an elongated tube 16 insertable in the container and having an enlarged-diameter chamber 18 adjacent its lower end. The chamber 18 forms a seal with the interior wall of the container, allowing the liquid above the chamber to be readily decanted off, after which all or a portion of the sample in the sealed portion of the container 10 can be drawn up into the chamber 18 for transport to a microscope slide or to some other analytical instrument.

The tube 16 is closed at its upper end by an enlarged-diameter bulb 20, which is compressible and resilient, and facilitates withdrawal of sample liquid from the sealable closed end 14 of the container 10. As shown in FIG. 1, the tube 16 is of such a length that the bulb 20 projects conveniently above the open end 12 of the container 10. The tube 16 communicates with the chamber 18. A lower tube portion **16*a* also communicates with the chamber 18 and depends downwardly therefrom almost to the bottom of the container 10,** so that nearly all of the liquid in the sealed portion can be withdrawn.

The open end 12 of the container 10 is enlarged with respect to the major portion of the container bore, and a portion of the wall of the container adjacent the open end 12 is flared radially outwardly and upwardly towards the open end, to define a funnel shaped portion 22 which facilitates convenient transfer of liquid to and from the container.

The lower end portion of the container 10 is tapered radially inwardly in a direction toward the closed end 14 of the container, to define a lower interior portion essentially of inverted cone shape. This configuration facilitates concentration of suspended solids by centrifuging. Additionally, the interior of the container 10 within its lower end portion is of reduced cross section with respect to the interior cross section adjacent the funnel shaped portion 22. As will be more fully explained hereinafter, a point at a predetermined distance along the longitudinal axis from the closed end 14 is selected such that the lower end portion of the container 10 between the selected point and the closed end will contain a predetermined volume of liquid. This point is referred to herein as the point of reduced cross section.

A suitable stopper or cap (not shown) can be provided to seal the open end 12 of the container 10 during centrifuging or the like. Volume indicia 24 are disposed along the container 10 for indicating and measuring liquid volume.

The outer circumference of the chamber 18 is selected to permit sufficient clearance between the chamber and the wall of the container 10 so that the tube 16 and chamber are readily inserted through the opening end 12 of the container 10, and can pass freely through the container bore until further movement of the chamber toward the closed end 14 is prevented by the point of reduced cross section. The outer periphery of the chamber 18 is brought into sealing engagement with the wall of the container at this point, and that portion of the container 10 between the chamber 18 and the closed end 14 is sealed from the remainder of the container interior.

An essential feature of the present invention is that the chamber 18, when in sealing engagement with the wall of the container 10, be spaced from the sealed end 14 of the container so that a uniform, predetermined volume of liquid is contained within the sealed space beneath the chamber. To this end, the outer diameter of the chamber 18 is selected to correspond substantially to the internal diameter of the container at the point of reduced cross section, so that when the tube 16 is fully inserted in the container 10, the periphery of the chamber 18 is in sealing contact with the container wall. An internal step of bead 26 of appropriate size is provided in the container 10 at the point of reduced cross-section, to ensure a perfect seal at the desired distance from the closed end 14. In the preferred embodiment, the internal diameter of the container 10 gradually decreases toward the closed end 14, so that a number of points of reduced cross section, selected along the longitudinal axis of the same container, can be utilized with chambers 18 having different outer diameters, to form sealed volumes of different sizes.

Since the tube 16 is sealed at its upper end by the bulb 20, liquid will be prevented from entering the lower tube portion **16*a* as the tube is inserted in the container 10. After the liquid above the chamber 18 has been decanted off, the bulb 20** can be manipulated to draw liquid into the chamber.

Once in the chamber, the sample liquid can be dispensed onto a microscope slide, transferred to another container (not shown) or shipped to another site for analysis, after plugging the lower tube portion **16*a*. The chamber 18** can also be utilized as a mixing chamber, to mix stains or chemical reagents with the sample.

The chamber 18 illustrated in FIGS. 1–3 is defined by cylindrical sidewall 30, a lower end wall 32 of conical shape, and an upper end wall 34, also of conical shape. The upper conical end wall 34 has a relatively gradual angle of taper, approximately thirty degrees to the longitudinal axis of the tube. The lower end wall 32 is tapered much more steeply to the diameter of the lower tube portion **16*a*, which is substantially smaller in diameter than the principal portion of the tube 16** above the chamber.

The gradual taper of the upper end wall 34 provides it with a relatively steep slope which has been found to be less conducive to an accumulation of liquid droplets after the liquid above the chamber 18 is decanted off. The capacity of the chamber 18 is sufficient to contain the entire liquid sample sealed in the container 10.

Other embodiments of the tube 16 are shown in FIGS. 4–6. FIG. 4 shows a tube 16' and a chamber 18' which includes a longer cylindrical portion 30' and an upper end wall 34' substantially symmetrical with the lower one 32'. In the FIG. 5 embodiment, the cylindrical portion 30' is foreshortened, leaving an essentially conical chamber 18''. Finally, FIG. 6 shows the use of a sealing collar 40 in place of the chamber 18. In this latter embodiment, liquid is drawn up into the tube itself, and the entire amount cannot be withdrawn at once.

In the embodiments of the invention illustrated, the container 10 is dimensioned to contain 12 ml of sample for examination. The configuration of the container 10 is such that it can be used with conventional laboratory centrifuges. The outer diameter of the chamber 18 is selected such that, when it is fully inserted and in sealing engagement with the wall of the container, a volume of 1 ml is formed between the chamber and the closed end 14 of the container.

In carrying out a urinalysis in accordance with the present invention, a 12 ml sample of urine is poured into the container 10 and the open end 12 is stoppered. The container 10 and sample are centrifuged for five minutes at 400g, i.e., at 400 times the gravitational acceleration force, causing the suspended solids to concentrate in the lower 1 ml portion of the container.

After centrifuging, the stopper is removed and the tube 16 is inserted into the container and moved towards the closed end 14 until 18 is engaged with the container wall as indicated by cessation of further movement of the tube. As mentioned above, the outer diameter of the chamber 18 and the taper of the wall of the container 10 are such that the chamber cannot be moved past the 1 ml mark of the container.

When the chamber 18 is positioned as described, the lower 1 ml volume of liquid having the solids concentrated therein is sealed from the remaining 11 ml in the upper portion of the container 10. The upper 11 ml of liquid are poured out of the container 10.

Following decantation, all or a portion of the liquid and suspended solids are drawn into the chamber 18, or, in the case of the FIG. 6 embodiment, into the tube 16, by compressing the bulb 20 to force out a portion of the air contained in the tube, and thereby forming a partial vacuum which is filled by the liquid. The tube 16 is then removed from the container 10, and the liquid may be subsequently dispensed from the chamber 18 onto a microscope slide, transferred to another container, or mixed with another substance in the chamber in preparation for further testing. The tube 16 and chamber 18 can also be stoppered and used as a container for mailing or carrying the sample to another location.

In accordance with the foregoing, it can be seen that, in conducting examinations of solids suspended in liquids, utilizing the present invention insures that the sample is prepared conveniently, quickly and in a uniform manner. The inventio n substantially eliminates variations in the technique of sample preparation which can result in a disparity in results, even between samples of the same liquid. Uniform sample preparation is achieved even when semi-skilled persons are employed to prepare the samples.

The apparatus of the present invention can be manufactured at relatively high production rates using inexpensive materials, and is thus particularly suited for manufacture as single-use disposable item. The tube 16, including the bulb 20 and chamber 18 can be conveniently fabricated by a blow-molding process using any of a number of suitable plastics.

While the container 10 has been described as having a cone-shaped lower end portion, it will be appreciated that the precise configuration of the container is not critical to the present invention. Thus, any container in which the interior is of reduced cross section at a point spaced from the closed end thereof, so as to permit the sealing of an end portion of predetermined volume, will be suitable for the present invention.

It will also be appreciated that the present invention represents a substantial advance in the field of laboratory analysis of liquids, such as urine, containing suspended materials. In particular, the invention provides a reliable technique for isolating a predetermined volume of sample liquid for subsequent analysis. Although specific embodiments of the invention have been described in detail for purposes of illustration, various modifications may be made without departing from the spirit and scope of the invention. Accordingly, the invention is not to be limited except by the appended claims.

I claim:

1. Apparatus for preparing liquid samples for examination and analysis, said apparatus comprising:

a container having a closed lower end and an open upper end, and having a reduced interior cross section at a point spaced from said closed end, with respect to the interior cross section near said open end; and tube means having an open lower end for removable insertion in said container, said tube means including a portion of enlarged cross section adjacent said lower end, with an outer periphery sized to sealingly engage said container at said spaced from said closed end thereof, to define a lower sealable chamber of predefined volume, and said tube means also including a sealed upper end and a compressibly resilient portion operable to withdraw liquid from said lower sealable chamber.

2. Apparatus as set forth in claim 1, wherein:

said container interior is of decreasing cross section from said open end toward said closed end;

said portion of enlarged cross section is fully movable through said container interior from said open end toward said closed end; and the cross section of said portion of enlarged cross section and the cross section of said container interior are substantially equal at said point of reduced cross section of said container interior, whereby said portion of enlarged cross section is sealingly engageable with said container wall to form said lower sealable chamber.

3. Apparatus as set forth in claim 1, wherein said portion of enlarged cross section defines a hollow chamber communicating with said upper and lower ends of said tube means; and sample liquid can be drawn into said hollow chamber from said lower sealed chamber by manipulating said compressibly resilient portion of said tube means.

4. Apparatus as set forth in claim 3, wherein said compressibly resilient means is a bulb forming said sealed upper end of said tube means.

5. Apparatus as set forth in claim 3, wherein said hollow chamber has a cylindrical sidewall and an adjoining upper conical end wall.

6. Apparatus as set forth in claim 1, wherein said portion of enlarged cross section is an annular sealing collar disposed on said tube means and sized to sealingly engage the interior wall of said container only at said point of reduced cross section.

7. Apparatus as set forth in claim 1, wherein said container includes an internal step at said point spaced from said closed end thereof, to ensure a good sealing contact at the desired distance from said closed end.

8. A method for preparation of a liquid containing suspended material therein for examination of the suspended material, said method comprising the steps of:
introducing a known volume of the liquid containing suspended material into a container having an open end and a closed end, and having toward its closed end a point of reduced interior cross-section, with respect to the interior cross section at the open end;
concentrating the suspended material in the closed end portion of the container;
sealing the closed end portion from the remainder of the container interior by inserting sealing means into the container, to form a fluid-tight seal between the closed end portion and the remainder of the container;
removing the liquid from the remainder of the container interior while maintaining the fluid-tight seal; and
withdrawing a sample of the liquid containing concentrated suspended material through a tube communicating through the sealing means with the closed end portion of the container.

9. A method as set forth in claim 8, wherein:
the sealing means defines a hollow chamber communicating with the tube; and
said step of withdrawing a sample includes compressing and releasing a bulb on the tube, to draw liquid into the hollow chamber.

10. A method as set forth in claim 9, and further including the step of mixing the sample liquid with another substance in the hollow chamber.

11. A method as set forth in claim 9, and further including the step of sealing the hollow chamber for transportation of the sample contained therein.

12. A method as set forth in claim 9, and further including the step of dispensing a small portion of the liquid from the hollow chamber analysis.

13. A method as set forth in claim 8, wherein:
the sealing means is an annular sealing collar; and
said step of withdrawing a sample includes drawing a small amount of liquid into the tube itself.

14. Apparatus for preparing liquid samples for microscopic examination of material suspended therein, said apparatus consisting of:
container having a closed end and an open end, the interior of said container at a point spaced from said closed end being of reduced cross-section with respect to the cross-section of said container interior proximate said open end thereof;
means for insertion into said container to form a sealed lower chamber therein; said means comprising an elongated tube, a sealing collar disposed on said tube adjacent one end thereof, the periphery of said collar sealingly engaging the wall of said container only at said point of reduced cross-section define in cooperation with said container wall and said closed end of said container a sealed chamber of predetermined volume, said one end of said elongated tube communicating with said sealed chamber and means for closing said tube to prevent liquid from entering therein and for drawing a sample of liquid into said tube from said sealed chamber.

15. The apparatus as defined in claim 14 wherein said container interior if of decreasing cross-section from said open end toward said closed end and said collar is fully movable through said container interior from said open end toward said closed end, the cross-section of said collar and said container interior being substantially equal at said point of reduced cross-section of said container interior whereby said collar is sealingly engaged with said container wall thereat to form said sealed chamber.

16. The apparatus as defined in claim 14 wherein the opposite end of said tube extends beyond said open end of said container and is sealed, at least a portion of said tube wall adjacent said sealed end being resiliently flexibly responsive to a force applied thereto normal to the axis of said tube thereby to create a reduction in pressure within said tube when said force is removed from said tube wall and to draw a portion of the contents of said sealed chamber into said tube.

17. A method for preparing a liquid containing suspended material therein for examination of said suspended material, said method comprising:
introducing a known volume of said liquid containing suspended material into a container having an open end and a closed end, said container interior being of reduced cross-section with respect to the interior proximate said open end at a point along the longitudinal axis of said container spaced from the closed end thereof to define an end portion of said container interior of predetermined volume lying between said point of reduced cross-section and said closed end;
concentrating said suspended material in said end portion of said container;
sealing said end portion from the remainder of said container interior by inserting a sealing collar into said container, said sealing collar having a cross-section dimension substantially equal to said container interior at said point of reduced cross-section whereby said collar cooperates with said container wall only at said point of reduced cross-section to form a fluid tight seal between said end portions and the remainder of said container interior;
removing the liquid from the remainder of said container interior while maintaining said fluid tight seal between said collar and said container wall; and
withdrawing a sample of said liquid containing concentrated suspended material from said end portion of said container for examination.

18. The method as defined in claim 17 wherein said collar is disposed on an elongated tube adjacent one end thereof and said tube and said collar are inserted in said container, said one end of the tube communicating with said end portion for withdrawing liquid therefrom when said end portion is sealed.

19. The method as defined in claim 18 wherein said opposite end of said elongated tube is sealed during the steps of insertion of said collar and removal of said liquid from the remainder said container interior thereby to prevent liquid from entering said one end of said elongated tube.

20. The method as defined in claim 17 wherein said liquid containing suspended material is urine.

21. The method as defined in claim 17 wherein said container is centrifuged to concentrate said suspended material in said end portion of said container interior.

* * * * *

UNITED STATES PATENT OFFICE
CERTIFICATE OF CORRECTION

PATENT NO. : 4,022,576
DATED : May 10, 1977
INVENTOR(S) : James E. Parker

It is certified that error appears in the above-identified patent and that said Letters Patent are hereby corrected as shown below:

Column 2, line 39, before "portion" insert --end--.

Column 5, line 26, after "until" insert --the chamber--;
line 65, after "as" insert --a--.

Claim 1, line 12, after "said" (second occurrence) insert --point--.

Claim 14, line 4, before "container" insert --a--.

Claim 15, line 2, delete "if" and insert therefor --is--.

Claim 17, line 32, after "container" insert --interior--.

Claim 18, line 4, delete "the" and insert therefor --said--.

Signed and Sealed this

*Eleventh* Day of *October 1977*

[SEAL]

*Attest:*

RUTH C. MASON
*Attesting Officer*

LUTRELLE F. PARKER
*Acting Commissioner of Patents and Trademarks*